Nov. 2, 1948.  H. E. NIETSCHE  2,452,864
MOTOR MECHANISM
Filed Aug. 18, 1944  2 Sheets-Sheet 1
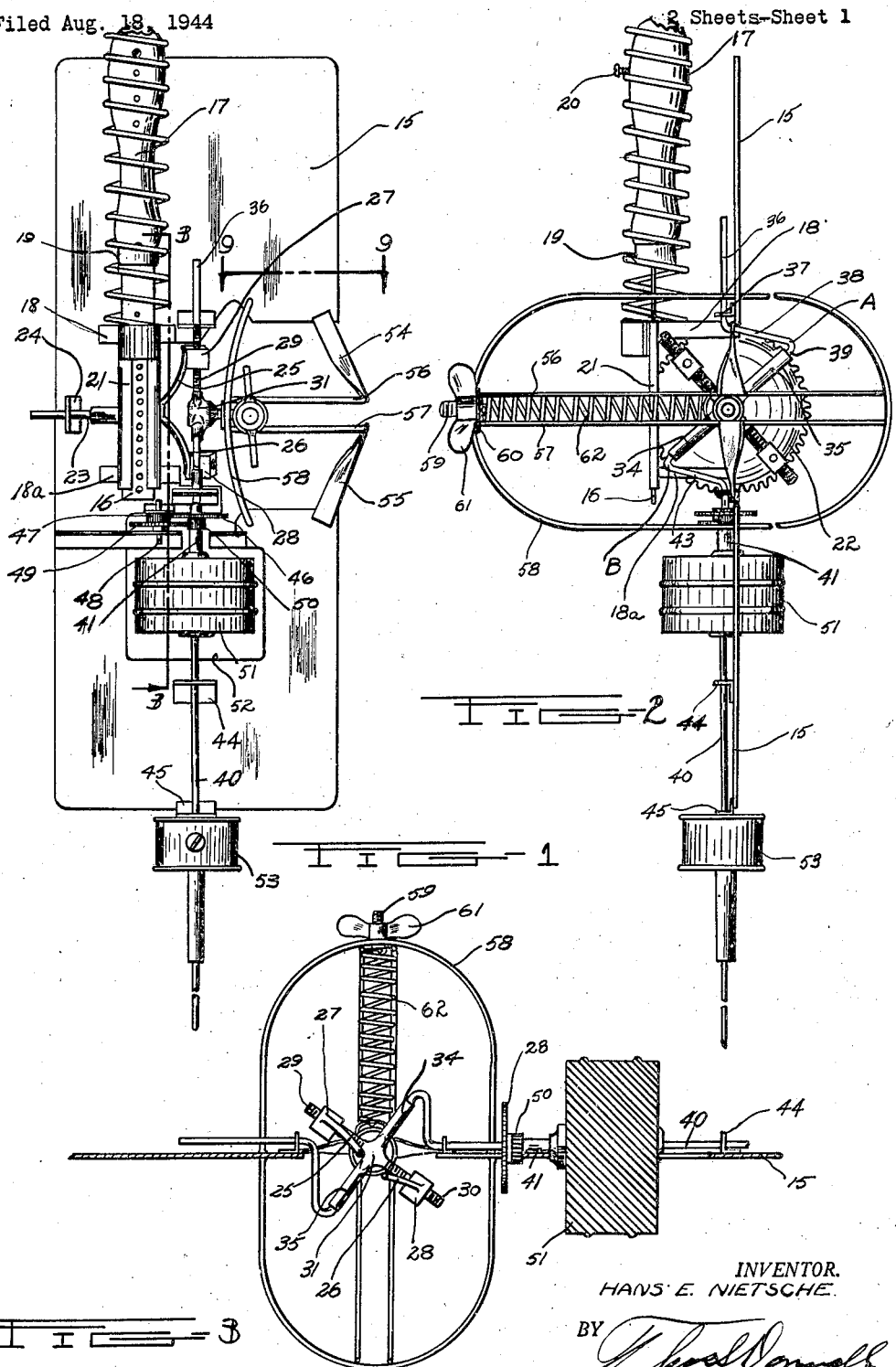
INVENTOR.
HANS E. NIETSCHE.
BY
HIS ATTORNEY Nov. 2, 1948.  H. E. NIETSCHE  2,452,864
MOTOR MECHANISM
Filed Aug. 18, 1944  2 Sheets-Sheet 2
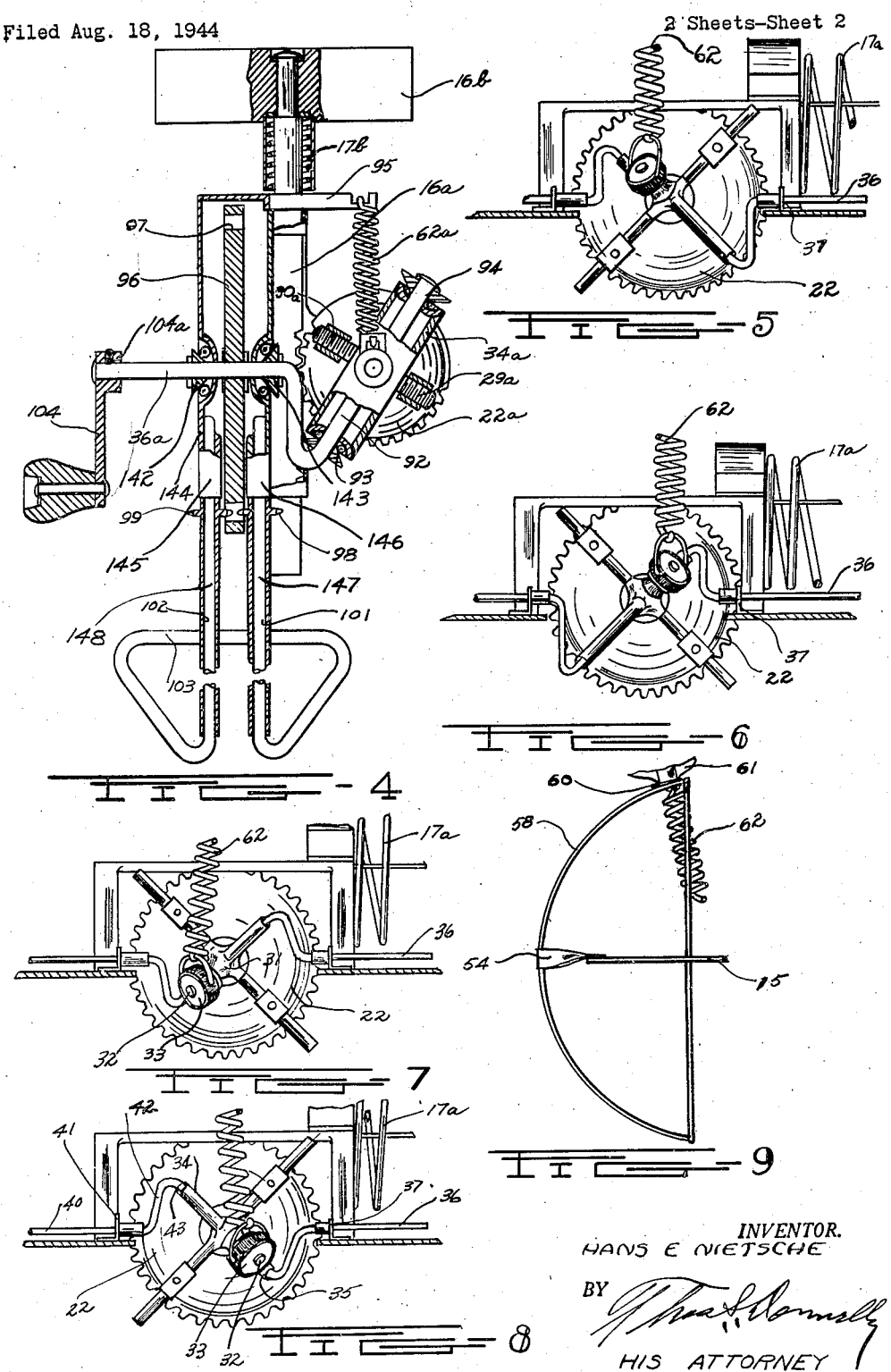
INVENTOR.
HANS E. NIETSCHE
BY
HIS ATTORNEY Patented Nov. 2, 1948

2,452,864

UNITED STATES PATENT OFFICE 2,452,864

MOTOR MECHANISM

Hans E. Nietsche, Detroit, Mich.

Application August 18, 1944, Serial No. 550,086

9 Claims. (Cl. 74—60)

My invention relates to a new and useful improvement in a power translating mechanism adapted for translating reciprocating power into rotating power or vice versa. It is an object of the present invention to provide a mechanism of this class whereby a reciprocating member may be utilized in conjunction with an oscillating member and the oscillating member associated with the rotating member in such a manner as when the oscillating member is oscillated, the rotating member will be caused to rotate or vice versa.

It is another object of the present invention to provide a mechanism of this class so arranged and constructed that the direction of operation of the translated power may be determined.

It is another object of the present invention to provide in a device of this class a reversing mechanism which may be easily and quickly operated.

It is another object of the present invention to provide a mechanism of this class embodying a crank shaft in which the crank pin of the crank shaft is located at an angle to the axis of the crank shaft varying from zero degrees to ninety degrees so as to vary or regulate the output efficiency of the crank.

Another object of the present invention is the provision in a mechanism of this class of a torque compensator absorbing the energy from the main source of power at about forty-five degrees past dead center of the crank to about one hundred twenty degrees and which thereupon releases its energy as useful work passing dead center to forty-five degrees for the next stroke.

Another object of the present invention is the provision of a mechanism of this class having a geared up fly wheel so that the weight of the fly wheel may be reduced and its speed determined to provide the necessary fly wheel effect.

Another object of the present invention is the provision of a device of this nature which will be simple in structure, economical of manufacture, durable, compact and highly efficient in use.

Other objects will appear hereinafter.

It is recognized that various changes and modifications may be made in the detail of structure illustrated without departing from the spirit of the invention and it is intended that such variations and changes may be embraced within the scope of the claims which form a part hereof.

Forming a part of this specification are drawings in which,

Fig. 1 is a front elevational view of one adaptation of the invention;

Fig. 2 is a side elevational view of Fig. 1;

Fig. 3 is a fragmentary, sectional view taken on line 3—3 of Fig. 1;

Fig. 4 is a longitudinal, central, sectional view of another adaptation of the invention;

Fig. 5 is a fragmentary, elevational view of a part of the structure shown in Fig. 1;

Fig. 6 is a view similar to Fig. 5, showing the structure in another position of operation;

Fig. 7 is a view similar to Fig. 6, showing the structure in another position of operation;

Fig. 8 is a view similar to Fig. 6, showing the structure in another position of operation;

Fig. 9 is a fragmentary view taken on line 9—9 of Fig. 1.

In Fig. 1, I have illustrated the invention used with a supporting frame comprising a supporting plate or member 15, projecting outwardly from which are brackets 18 and 18A which serve to support a guide sleeve or tube 21 in which slidably projects a rack bar 16 having a handle 17 mounted thereon. A coil spring 19 engages the one end against the bracket 18 and at its opposite end against the screw 20 which is threaded into the handle 17 and serves as an abutment for the spring 19.

The rack bar 16 meshes with the gear 22 which is fixedly mounted on the shaft 23 journaled in the bearing 24 mounted on the base or supporting plate 15. This shaft 23 carries the divergent arms 25 and 26. Mounted respectively on the end of these arms are the nut-forming members 27 and 28. Threaded through these members 27 and 28 are the rods 29 and 30 which radiate outwardly from a central hub 31, the rods 29 and 30 being in diametrical alignment. Extending radially outwardly from the hub 31 are the tubular sleeves 34 and 35 which are also in alignment and extended at right angles to the rods 29 and 30, as clearly appears in Fig. 3. Extending diametrically through the hub 31 is a tube embodying the lateral projections 34 and 35, as clearly shown in Fig. 3. Journaled in the brackets 37, 44 and 45 which are mounted on the base 15 is a rod or drive shaft 36, having a crank formed intermediate its ends to provide the angular turned portions 38 and 43 and the portion 39 which extends through the tube arms 34 and 35 so that a portion of the crank is thus journaled in the tubular member which extends through the hub 31. The portion 43 terminates in the elongated drive shaft forming portion 40. As shown in Fig. 1 and Fig. 2, a gear wheel 46 is fixedly mounted on the shaft 40, this gear meshing with the gear 47 fixedly mounted on the shaft 48. A gear 49 is also fixedly mounted on the shaft 48 and meshes with the gear 50 which is fixedly mounted on a hollow shaft 41 through which the shaft 40 projects. Fixedly mounted on the shaft 41 is a flywheel 51 which engages in the opening 52 formed in the supporting plate 15. A pulley or power take-off 53 is fixedly mounted on the shaft 40.

Connected by the brackets 54 and 55 to the supporting plate 15 are the semi-circular rods 56 and 57. An endless band 58 also serves to connect these rods to the base or plate 15. A bolt 59 having a head 60 is provided with a wing nut 61, the head 60 being positioned on one side of the rods 56 and 57 and the wing nut 61 on the other side so that the bolt 59 may be secured in any position on the semi-circular rods 56 and 57. This bolt 59 is connected by the spring 62 to a nut 33 which is threaded on a stud 32 projecting outwardly from the hub 31.

In operation, the reciprocation of the rack bar 16 will effect a rotation of the shaft 40. As the handle 17 is pressed downwardly from the position shown in Fig. 1 and Fig. 2 the pressure will be against the compression of the spring 19. This will force the rack bar 16 to travel downwardly and cause the gear 22 to rotate in a direction counter clockwise in the position shown in Fig. 2. As this rotation is effected, the arms 25 and 26 will rock on the shaft 23 as an axis. Through the connection of the studs 29 and 30, the hub 31 will be rocked on its axis or on the axis of the shaft 23. The connection between the blocks 28 and 27 is such that the rods 29 and 30 may freely rotate therein.

Since the rod 36 and its extending portion 40 rotate in the brackets 37, 44 and 45, which are in alignment, the points A and B (shown in Fig. 2) of the crank will rotate in circles having the same axis as the shaft 36. Consequently, as the rocking effected by the arms 25 and 26 on the hub 31 is carried on, the hub will rock on the axis of the rods 29 and 30. Thus, when the shaft 23 is rocked a predetermined distance in one direction, the shaft 40 will be rotated half a revolution in a certain direction and in order to continue rotating the shaft 40 in the same direction, the rods 29 and 30 would have to be rocked in the opposite direction through the same rocking arc. The degree of rocking of these arms will depend upon the angularity of the crank portions 38, 43 and 39. If the angularity is sixty degrees, the arms 25 and 26 would be rocked one hundred twenty degrees in one direction in order to effect a one-half rotation of the shaft 40 and the reverse rocking of the arms would be the same. Should this angularity be seventy degrees, the arms would have to be rocked one hundred forty degrees in one direction and the same in the reverse. This is accomplished by the reciprocation of the rack bar 16 against the compression of the spring 19 which serves to return the rack bar to the former position. The tension of the spring may be adjusted by moving the screw 20 to various positions lengthwise of the handle. The spring 62 serves to retain the hub 31 and thereby the sleeves 34 and 35 in the position on one side of a plane in which the axis of the shaft 36 lies so that when reciprocation begins, it will always be in the same direction. By loosening the wing nut and swinging the same down to the other side of the structure from that shown in Fig. 2, the direction of rotation of the shaft 40 would be reversed because the spring would serve to retain the mechanism in the position opposite to that shown in Fig. 5 and Fig. 6. By retaining the nut swung to this position, the stopping of the mechanism on dead center is prevented so that when pressure is delivered to the rack 16, reciprocation will be effected. Should the bolt 59 be moved from the position shown in Fig. 2 or Fig. 3 so as to lie in the plane of the base 15, the swinging of the bolt 59 would have been through an arc of ninety degrees. When located at this point, the spring 62 would then retain the structure on neutral or dead center and a reciprocation of the rack bar 16 could not be effected. As the bolt 59 is swung to various positions on the rods 56 and 57, the rocking of the arms is effected and thus the the tension of the spring 62 will be varied when leverage exerted through the stud 32 varied. This leverage may also be varied by threading the nut 33 onto the stud or outwardly of it.

The illustration shown in Fig. 5 shows the location of the rods 29 and 30 at the initial movement. Fig. 7 shows these parts in the position where the rod 32 is about to approach dead center. Fig. 8 shows the parts in the position where the movement has continued until the member 32 has passed dead center; and Fig. 6 shows the completion of the movement. It will be noted that the member 32 ends on the side opposite to the side at which it began at Fig. 5 and its path of travel is virtually a figure 8. The connection of the spring 62 and the method of adjusting it affords an easy and simple method of reversing the direction of rotation.

By rotating the flywheel through the intermediary of gears, as illustrated, it becomes possible to reduce the weight of the flywheel because of its increased speed.

In Fig. 4, I have shown an application of the invention to an egg beater or the like. In this construction, a reciprocating rack bar 16a is provided which meshes with the teeth in a pinion 22a. The shaft 36a corresponds to the shaft 36 shown in Fig. 2. The shaft 36a is journaled in the thrust bearings 142 and 143 which are mounted on the supporting frame 144. This shaft 36a is provided with a crank 92 which extends through and is journaled in the thrust bearings 93 and 94 carried by the tubular sleeve 34a. This tubular sleeve 34a corresponds to the tubular parts 34 and 35 shown in Fig. 2; the construction otherwise being substantially the same as shown in the other views. The rods 29a and 30a are connected to the rotating shaft on which the pinion 22a is fixedly mounted by means of a yoke in the manner already described and the spring 62a serves the function of the spring 62, the spring 62a being connected at one end to the bracket arm 95 which projects outwardly from the frame. Upon reciprocating the rack bar 16a through pressure on the hand grip 16b against compression of the spring 17b, the pinion 22a is rocked which effects a rotation of the shaft 36a in the same manner that the shaft 36 shown in Fig. 2 is rotated. Fixedly mounted on the shaft 36a is a gear 96 having the circumferential row of spaced apart openings 97 formed therein. Pressed into the sleeves 145 and 146 formed on the frame 144 are the spaced apart rods 147 and 148. In the construction shown, these rods are formed from a single piece of metal. The ends are angularly turned to extend at right angles to the main body of the rods 147 and 148 to provide the foot or supporting base 103. Rotatably mounted on the rods 147 and 148 are the tubes 101 and 102 which serve as drive shafts. Fixedly mounted on these tubes are the pinions 98 and 99 which are adapted to mesh with the openings 97 formed in the gear 96 so that as the gear 96 is rotated, the tubes 101 and 102 will be rotated. Any suitable working tool may be mounted on these tubes, such as whipping or beating blades, in the manner to resemble well known egg beaters or whipping tools. Through a reciprocation of the rack 16a, the tools would be caused to rotate rapidly and effect the desired work.

Mounted on the shaft 36a and fixed thereto by means of the set screw 104a is a crank 104. By loosening the set screw, the crank 104 may be turned to any desired angle on the shaft 36a and fixed in this relation.

If desired, the crank 104 may be removed entirely.

However, in one form of operation, the crank 104 will serve an important function. The operator, in operating the mechanism, may use one hand to effect the downward pressing on the rack bar 16a and at the same time use the other hand to effect a rotation of the shaft 36a through the medium of the crank 104. In this way, there are two sources of applied power, which is translated and transmitted to the rotating tubes 101 and 102.

In the form shown in Fig. 1, the work may be performed by the reciprocating member and the power which affects the reciprocating delivered either through the shaft 36 or the shaft 23. Likewise, the power may be applied to the shaft 36 and the work performed by the shaft 23 where a rocking or alternate application of power is desired.

What I claim as new is:

1. A power translating device of the class described, comprising: a rotatable shaft; a gear fixedly mounted on said shaft; reciprocating means for rocking said gear alternately in opposite directions; a crank shaft having a crank intermediate its ends; a pair of arms projecting diametrically outwardly from the crank of said crank shaft intermediate its ends at substantially right angles thereto; a yoke for connecting said arms to said gear bearing shaft; a stud projecting outwardly from the juncture of said arms and said crank at substantially right angles to the axes of both said arms and said crank; a supporting member for supporting said first-named shaft; a spring connected at one end of said stud and at the opposite end to said supporting member.

2. A power translating device of the class described, comprising: a rotatable shaft; a gear fixedly mounted on said shaft; reciprocating means for rocking said gear alternately in opposite directions; a crank shaft having a crank intermediate its ends; a pair of arms projecting diametrically outwardly from the crank of said crank shaft intermediate its ends at substantially right angles thereto; a yoke for connecting said arms to said gear bearing shaft; a stud projecting outwardly from the juncture of said arms and said crank at substantially right angles to the axes of both said arms and said crank; a supporting member for supporting said first-named shaft; a spring connected at one end of said stud and at the opposite end to said supporting member; and means for moving the point of connection of said spring to said supporting member to opposite sides thereof for determining the direction of rotation of said shaft.

3. In a mechanism of the class described: a supporting frame; a rotatable shaft on said supporting frame; a rack and pinion mechanism for rotating said shaft; a crank shaft having a crank intermediate its ends; a tubular member embracing said crank and rotatable relatively thereto; a pair of arms projected outwardly from said tubular member with their axes in alignment and at right angles to the axis of said crank; a yoke for connecting said arms to said first-named shaft, the rocking of said first-named shaft alternately in opposite directions effecting a rotation of said crank shaft through said yoke and arms; and means for determining the direction of rotation.

4. In a mechanism of the class described: a supporting frame; a rotatable shaft on said supporting frame; a rack and pinion mechanism for rotating said shaft; a crank shaft having a crank intermediate its ends; a tubular member embracing said crank and rotatable relatively thereto; a pair of arms projected outwardly from said tubular member with their axes in alignment and at right angles to the axis of said crank; a yoke for connecting said arms to said first-named shaft, the rocking of said first-named shaft alternately in opposite directions effecting a rotation of said crank shaft through said yoke and arms; means for determining the direction of rotation and regulating the degree of torque.

5. In a mechanism of the class described; a supporting frame; a rotatable shaft on said supporting frame; a rack and pinion mechanism for rotating said shaft; a crank shaft having a crank intermediate its ends; a tubular member embracing said crank and rotatable relatively thereto; a pair of arms projected outwardly from said tubular member with their axes in alignment and at right angles to the axis of said crank; a yoke for connecting said arms to said first-named shaft, the rocking of said first-named shaft alternately in opposite directions effecting a rotation of said crank shaft through said yoke and arms; means for determining the direction of rotation and regulating the degree of torque; and a flywheel mounted on said crank shaft independently rotatable thereof; and a gear mechanism actuated by said crank shaft for driving said flywheel at a speed greater than the speed of said crank shaft.

6. In a mechanism of the class described: a supporting frame; a shaft rotatably mounted on said frame; a rack and pinion mechanism for rotating said shaft; a yoke rotatable in unison with said shaft and projected outwardly from one end thereof, the arms of said yoke being divergent; a crank shaft having the crank intermediate its ends, the crank thereof being projected transversely of the axis of said shaft; a tubular member embracing said crank and rotatable relatively thereto; a pair of arms projecting outwardly from opposite sides of said tubular member in alignment with each other and with their axes extended transversely of the axis of said crank; adjustable means for connecting the ends of said yoke arms to said last-named arms for, upon the rocking of said first-named shaft, effecting a rocking of said arms and a rotation of said crank shaft; and means for determining the torque upon the rotation of said crank.

7. In a mechanism of the class described: a supporting frame; a shaft rotatably mounted on said frame; a rack and gear mechanism associated with said shaft for effecting the rotation of the same; a pair of yoke arms rotatably in unison with and projecting outwardly in divergent relation from one end of said shaft; a crank shaft having a crank intermediate its ends, the axis of said crank being extended transversely of the axis of said first-named shaft; a tubular member embracing said crank and rotatable thereon; a pair of arms each projecting outwardly from opposite sides of said tubular member with their axes in alignment and extended transversely of the axis of said crank; means for adjustably connecting said pair of arms at various points intermediate their ends with said yoke arms; and means connected to said tubular member and movable relatively to said frame for determining the direction of rotation of said crank shaft upon the actuation of said rack and pinion mechanism.

8. In a mechanism of the class described: a supporting frame; a shaft rotatably mounted on said frame; a crank on said shaft; a supporting body rotatably mounted on said crank; a pair of arms projecting outwardly from opposite sides of said body with their axes extended transversely of the axis of said crank; a second rotatable shaft on said supporting structure with its axis extended transversely of the axis of said first-mentioned shaft; a yoke mounted on said second named shaft and projecting outwardly with its arms extended on opposite sides of said crank and connected to said supporting body at opposite sides of said crank.

9. In a mechanism of the class described: a supporting frame; a shaft rotatably mounted on said frame; a yoke having a pair of spaced apart arms mounted at the center of its base on the end of said shaft and projecting outwardly therefrom; a second shaft rotatably mounted on said supporting structure; a crank on said second shaft; a connecting member rotatably mounted on said crank and connected to the arms of said yoke in rotatable relation for effecting a rocking of said first-named shaft upon rotation of said second-named shaft.

HANS E. NIETSCHE.

REFERENCES CITED

The following references are of record in the file of this patent:

UNITED STATES PATENTS

| Number | Name | Date |
|---|---|---|
| 1,064,437 | Bostwick | June 10, 1913 |
| 1,075,308 | Skinner | Oct. 7, 1913 |
| 1,336,863 | Runnion | Apr. 13, 1920 |
| 2,225,512 | Stiles | Dec. 17, 1940 |